United States Patent [19]

Berthold et al.

[11] Patent Number: 5,086,220
[45] Date of Patent: Feb. 4, 1992

[54] RADIATION IMAGING FIBER OPTIC TEMPERATURE DISTRIBUTION MONITOR

[75] Inventors: John W. Berthold, Salem; Cevdet G. Koksal; Larry A. Jeffers, both of Alliance, all of Ohio

[73] Assignee: The Babcock & Wilcox Company, New Orleans, La.

[21] Appl. No.: 650,504

[22] Filed: Feb. 5, 1991

[51] Int. Cl.$^5$ .................. B21B 37/10; G01J 5/00
[52] U.S. Cl. .................. 250/227.20; 250/571; 374/130; 374/137; 385/123
[58] Field of Search .................. 374/124, 137, 153; 250/227.24, 227.26, 571, 227.20; 350/96.29

[56] References Cited

U.S. PATENT DOCUMENTS

| | | | |
|---|---|---|---|
| 4,408,903 | 10/1983 | Baldasarri | 374/153 X |
| 4,472,797 | 9/1984 | Nicia | 350/96.19 X |
| 4,516,864 | 5/1985 | Kim et al. | 374/131 X |
| 4,559,819 | 12/1985 | Deppe et al. | 374/137 X |
| 4,579,461 | 4/1986 | Rudolph | 374/9 |
| 4,644,173 | 2/1987 | Jeffers | 250/554 |
| 4,765,752 | 8/1988 | Beynon et al. | 374/153 |
| 4,840,496 | 6/1989 | Elleman et al. | 374/124 |
| 4,881,823 | 11/1989 | Tanaka et al. | 374/9 X |
| 4,955,979 | 9/1990 | Denayrolles et al. | 374/124 X |

Primary Examiner—Daniel M. Yasich
Attorney, Agent, or Firm—Vytas R. Matas; Robert J. Edwards; Daniel S. Kalka

[57] ABSTRACT

A monitor for measuring the temperature distribution of a product (12) including a plurality of ball lenses (14) lying in a lenticular array (18) across the product (12). A signal processor (22) is connected to a photodiode array (20). Each photodiode in the array (20) is connected by a separate optical fiber (16) to one of the ball lenses (14).

12 Claims, 4 Drawing Sheets

RADIATION IMAGING FIBER OPTIC TEMPERATURE DISTRIBUTION MONITOR

FIELD AND BACKGROUND OF THE INVENTION

The present invention relates in general to temperature sensors, and in particular, to a new and useful temperature distribution monitor which is capable of measuring the distribution of relatively low temperatures across a product, especially where the product moves with respect to the monitor.

U.S. Pat. No. 4,644,173 discloses a Flame Quality Analyzer developed by The Babcock & Wilcox Company. This patent, which is incorporated here by reference, discloses a device designed for measuring high temperature ranges, in particular, those present in flames or the like.

In many industrial applications such as in metals processing, paper production, glass making, and plastic sheet fabrication, it is necessary to measure the temperature distribution over a large area of product and identify non-uniformities. Often these measurements must be made over temperatures ranging from ambient to above 1800° F.

Infrared radiation pyrometers may be used for these measurements, but some type of mechanical scanning must be performed in order to cover the large area of product. Either the pyrometer itself must be moved or a rotating mirror must be used to reflect radiation from different regions of the product onto the pyrometer at different times.

SUMMARY OF THE INVENTION

The temperature distribution monitor of the present invention monitors the temperature at a series of closely spaced points along a line across the width of the product, and along the length of the product if the product moves under the monitor. The monitor comprises an array of ball lenses which are distributed perpendicular to the direction of movement and which are each connected by a separate optical fiber to a separate photo detector in a photo detector array. The photo detector array is connected to a signal processor for measuring signals that correspond to the radiation picked up by the lenses and transmitted along the optical fibers. To allow measurement at a large number of points without excessive duplication of expensive parts, the signals from the individual pick-up channels are multiplexed by the signal processor.

The present invention is capable of measuring temperatures below 200° F. to above 1800° F.

Accordingly an object of the present invention is to provide a temperature distribution monitor for monitoring the temperature distribution along and across a product which moves in a direction of movement with respect to the monitor, the monitor comprising: a lenticular array containing a plurality of ball lenses extending across the direction of movement; an optical fiber connected to each lens; a photo detector coupled to each optical fiber for receiving a radiation signal from each lens, the photo detectors being positioned in a photo detector array; and a signal processor containing a multiplexer and being connected to the photo detector array for processing signals from each photo detector in the array.

A further object of the present invention is to provide a temperature distribution monitor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
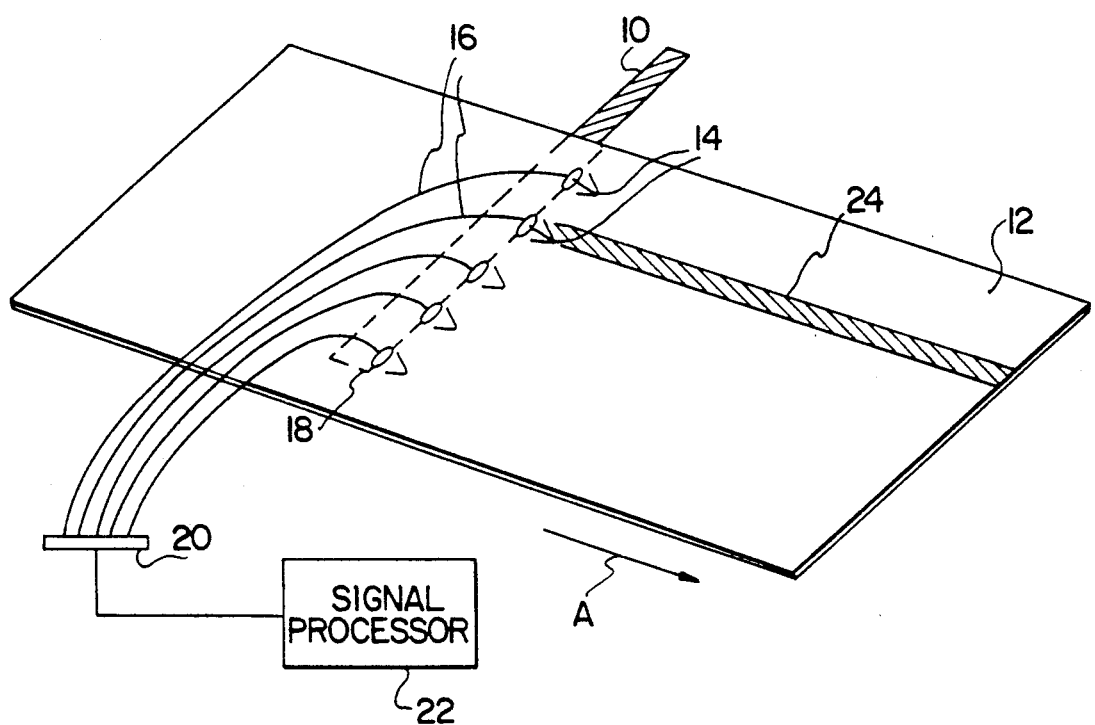
FIG. 1 is a schematic perspective view of one embodiment of the temperature distribution monitor of the present invention shown for use in measuring the temperature distribution of a piece of sheet material.

FIG. 1 illustrates the monitor of the invention. The invention comprises a scan head assembly (10) which is mounted above a hot product (12) to be monitored. The product may be moving in the direction of arrow A under the stationary head assembly so that temperatures are obtained along the product length as well as across the width. The product is sheet material in FIG. 1. Each small ball lens (14) in the stationary head images radiation from a small (about 1 cm$^2$) area of the hot product into a separate optical fiber 16. The radiation intensity transmitted by each fiber is related to the temperature in each small area through the Planck blackbody radiation law. The lenses (14) are in a lenticular array (18). An imaging stripe (24) is monitored by each lens.

Figure 2:
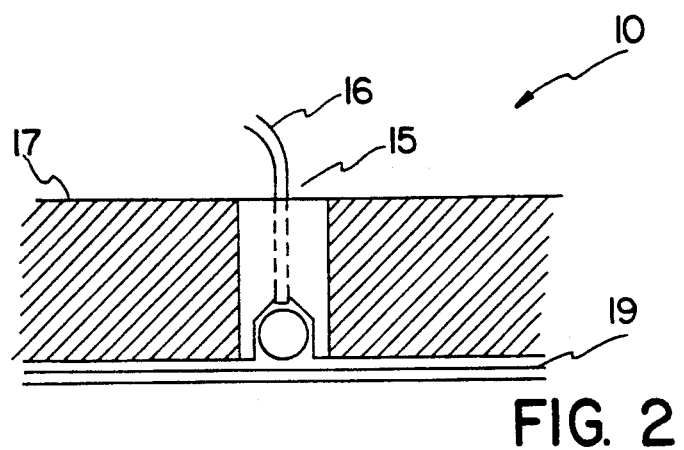
FIG. 2 is a cross-sectional illustration of an optical fiber in the pick-up head.

In the pick-up head (10), each optical fiber (16) is epoxied or glued into a ferrule (15) which is preferably brass. Ferrule (15) aligns the fiber (16) with the ball lens (14) as shown in FIG. 2. The ferrules (15) are held in an aluminum bar (17) mounted inside a rectangular, air-purged housing (not shown). As shown a glass retainer plate (19) separates the pick-up head (10) from the workpiece (12).

The radiation in a broad wavelength band may be monitored by a photodiode array (20) as shown in FIG. 1. In this case, blackbody radiation level and corresponding electrical output signal from each photodiode changes exponentially with temperature. This approach gives the greatest sensitivity to small temperature changes at low product temperatures. More fibers, lenses, and photodiode arrays could be used to accommodate greater spatial resolution on the hot product surface. The signal processor (22) is configured to provide a temperature distribution profile along the length and across the width of the product. In this embodiment, short wavelength visible and near-infrared radiation is measured up to 1.6 μm wavelength. 400 μm core silica fiber is used along with a germanium photodiode array.

Advantages of the invention include:

1. The temperature distribution monitor can cover a large product width;
2. No mechanical scanning is required;
3. Useful in harsh industrial environments; and
4. EMI/RFI resistance based on use of optical fibers.

Figure 3:
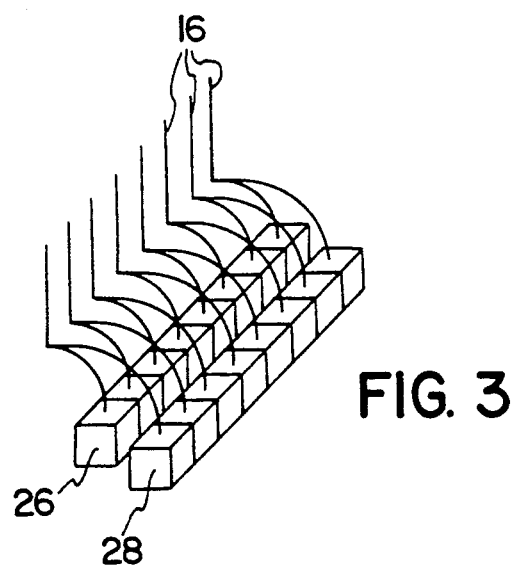
FIG. 3 is a schematic perspective view of an alternate embodiment of the invention utilizing multiple photo detector arrays.

For use in dirty industrial environments, the radiation output from the fibers may be split between different wavelength filters and different photodiode arrays (26) and (28) having different spectral sensitivities and show in FIG. 3. The signal ratio from individual photodiode elements in each array (using the same fiber) changes linearly with temperature, but this ratio is less sensitive to small temperature changes. This mode of operation is similar to the Flame Quality Analyzer of The Babcock & Wilcox Company and can be used if the scan head operation environment is dirty. Deposits on the lens surfaces would attenuate radiation at the two wavelengths by the same amounts.

Figure 4:
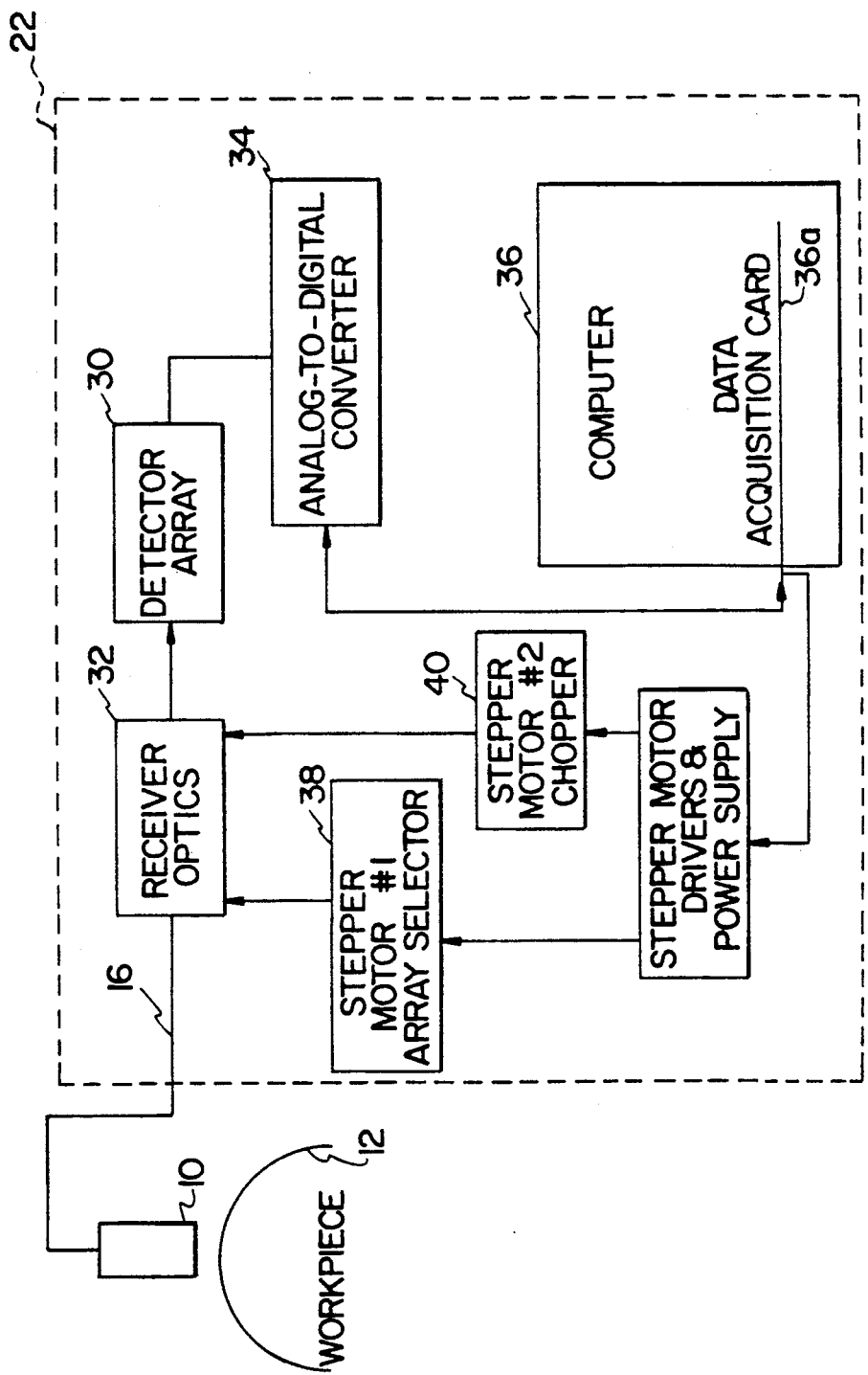
FIG. 4 is a block diagram of the preferred embodiment of the present invention.

Preferably, as shown in FIG. 4, to allow measurement at a large number of points without excessive duplication of expensive parts, the signals from the individual pick-up channels are multiplexed by the signal processor (22) which is a device known to those skilled in this art and commercially available. Although there are typically one hundred sixty measurement points there is only one detector array (30) containing sixteen individual detectors. At the receiver (32) the fibers (16) are aligned in ten parallel linear arrays (50) of sixteen fibers (16) each. In operation the first line of fibers is focused onto the detector array (30) and read out. Then, the second line of fibers is focused onto the detector array (30) and read out, etc. The positioning of the fibers in the signal processor (22) is accomplished automatically by a motorized translator under control of the signal processing computer.

The fiber bundle containing optical fibers (16) that carry the radiation from the pickup heads (10) to the receiver (32) consists of up to 160 fibers. At the receiver (32) light emerges from the fibers (16 and is focused onto an array of detectors (30) having preamps. The detector outputs are input to an analog to digital converter (34) that runs under control of the computer (36). In addition to acquiring the detector signals, the plug-in data acquisition card (36(a)) in computer (36) also provides the digital output pulses that control two stepper motors (38, 40). Stepper motor #1 (38) controls the position of the fibers, while motor #2 (40) drives a chopper wheel (44) to provide an AC signal to the detectors.

Figures 5, 6:
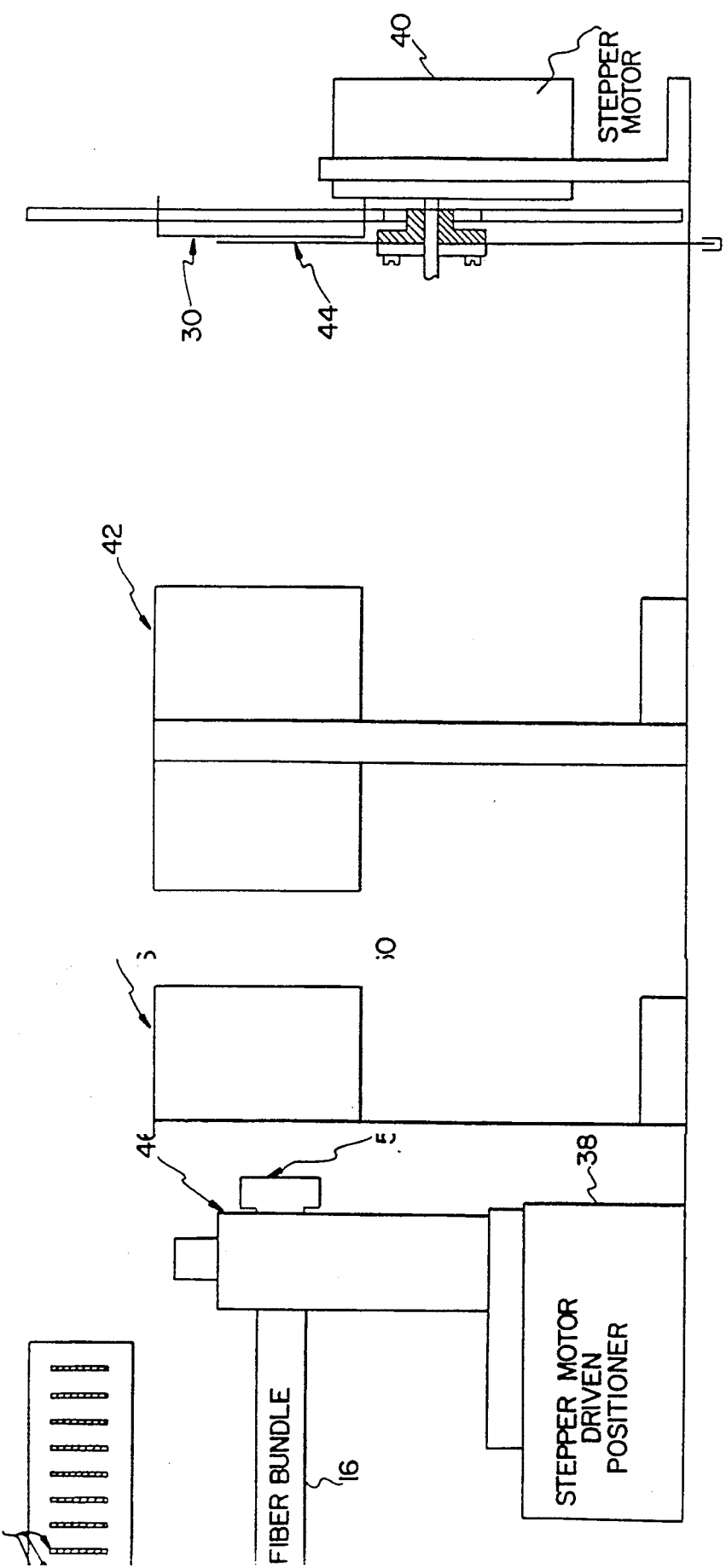
FIG. 5 is a sectional diagram of the receiver component layout in the preferred embodiment.
FIG. 6 is an end view of optical fibers (16) in a sixteen by ten array (50).

FIG. 5 is a diagram showing the arrangement optoelectronics of the present invention. The fibers (16) are terminated in parallel linear arrays of sixteen fibers each as shown in end view FIG. 6. Within each array (50) the center to center spacing fibers is 1 mm, which matches the spacing of the sixteen detector array (30). The relay lens system (42) focuses the output of one of the sixteen fiber arrays onto the sixteen detector array so that each detector views a separate fiber in the array (50). The chopper wheel (44) interposed between the lens (42) and the detector (30) modulates the radiation.

The precision xyz translator (46) is used during initial set-up of the equipment to manually achieve the best alignment of the fiber image with the detector array (30). Once the system is in operation, the stepper motor driven positioner (38) on which the translator (46) is mounted, is used to automatically (under software control) alternate among the fiber arrays (50).

The temperature distribution monitor of the invention differs from the device described in U.S. Pat. No. 4,644,173 (the FQA patent) in three significant respects. These are summarized as follows:

1. The optical pickup module for the temperature monitor of the invention is significantly different from the problem described in the FQA patent. The use of ball lenses in the inventive pickup module minimize alignment considerations during assembly. Thus the optical pickup of the invention is readily fabricated by less-skilled labor and more suitable for commercialization.

2. To achieve the 160 (or more) measurement point capability of the invention without the duplication of expensive optical components, precision mechanical translation is employed within the opto-electronics processor to sequentially align the optical fibers with a single photo detector array (multiplexing).

3. The lowest measurable temperature for the FQA is approximately 1800° F., making it unsuitable for the application addressed by the device of the invention (e.g., for paper manufacturing). For the invention, the temperature measurement range is extended to below 200° F. by using newly-available photo detector arrays and other associated techniques as cooling of the detector arrays by liquid nitrogen or thermal-electric devices (not shown).

The application of multi-point optical pyrometry using fiber optics for "cold" surface temperature monitoring is a significant advancement. In contrast to previously discussed metals applications, cold surfaces are defined as not emitting light in the visible or near-infrared. The collection, transmission, and processing of such wavelengths is a nontrivial task.

While specific embodiments of the invention have been shown and described in detail to illustrate the application of the principles of the invention, it will be understood that the invention may be embodied otherwise without departing from such principles.

What is claimed is:

1. A temperature distribution monitor for monitoring the temperature distribution of a product, comprising:
   an array containing a plurality of lenses extending across the product, each of said lenses collecting radiation from an area of the product;
   an optical fiber for each lens receiving radiation intensity therefrom;
   at least one photo detector array optically coupled to the optical fibers for receiving the radiation intensity transmitted therethrough and establishing signals indicative of the radiation intensity transmitted therethrough; and
   a signal processor connected to the at least one photo detector array for receiving and measuring said signals from each lens which correspond to radiation picked up by the lenses to monitor the temperature distribution of the product.

2. A monitor according to claim 1, wherein the product moves in a direction with respect to the monitor.

3. A monitor according to claim 1, wherein said at least one photo detector array comprises a photodiode array.

4. A monitor according to claim 3, wherein said photodiode array is a germanium photodiode array.

5. A monitor according to claim 1, including at least two photo detector arrays, each of said photodetector arrays containing an array of photo detectors, one photo detector from each of said arrays being optically connected to each of the optical fibers, each photo detector in one of said arrays having a different spectral sensitivity than each photo detector in the other said array.

6. A monitor according to claim 1, wherein said lenses lie along a line extending perpendicular to the direction of movement of the product.

7. A monitor according to claim 1, wherein said array comprises a lenticular array.

8. A monitor according to claim 1, wherein said lenses comprise ball lenses.

9. A monitor according to claim 8, further comprises a mounting bar for holding a plurality of ferrules, each of said ferrules aligning each of said optical fibers with each of said ball lenses.

10. A monitor according to claim 9, further comprising a retainer plate situated between said mounting bar and the product for separating the lenses from the product.

11. A monitor according to claim 1, wherein said plurality of lenses comprises one hundred sixty lenses with said optical fibers being aligned in ten parallel linear arrays having sixteen optical fibers in each linear array, and said photo detector array contains sixteen individual detectors.

12. A monitor according to claim 11, further comprising means for mechanically translating a single linear array of sixteen optical fibers sequentially to align with the detector array so that each individual detector views a separate optical fiber in the linear array.

* * * * *